US012725243B2

(12) United States Patent
Lin et al.

(10) Patent No.: US 12,725,243 B2
(45) Date of Patent: Sep. 1, 2026

(54) PRECISION THREE-DIMENSIONAL PAVEMENT FAULTING MEASUREMENT METHOD AND APPARATUS

(71) Applicant: Wuhan Optics Valley Zoyon Science and Technology Co., Ltd., Wuhan (CN)

(72) Inventors: Hong Lin, Wuhan (CN); Min Cao, Wuhan (CN); Yi Lu, Wuhan (CN); Xinlin Wang, Wuhan (CN); Xuan Qu, Wuhan (CN); Hui Li, Wuhan (CN); Xiuwen Hu, Wuhan (CN)

(73) Assignee: Wuhan Optics Valley Zoyon Science and Technology Co., Ltd., Wuhan (CN)

(*) Notice: Subject to any disclaimer, the term of this patent is extended or adjusted under 35 U.S.C. 154(b) by 281 days.

(21) Appl. No.: 18/721,828

(22) PCT Filed: Apr. 7, 2022

(86) PCT No.: PCT/CN2022/085609
§ 371 (c)(1),
(2) Date: Jun. 19, 2024

(87) PCT Pub. No.: WO2023/115754
PCT Pub. Date: Jun. 29, 2023

(65) Prior Publication Data

US 2025/0086777 A1 Mar. 13, 2025

(30) Foreign Application Priority Data

Dec. 21, 2021 (CN) ......................... 202111572820.4

(51) Int. Cl.
*G06T 7/00* (2017.01)
*G06T 5/70* (2024.01)

(52) U.S. Cl.
CPC .............. *G06T 7/0004* (2013.01); *G06T 5/70* (2024.01); *G06T 2207/10028* (2013.01); *G06T 2207/30132* (2013.01)

(58) Field of Classification Search
CPC ..................... G06T 7/0004; G06T 5/70; G06T 2207/10028; G06T 2207/30132;
(Continued)

(56) References Cited

U.S. PATENT DOCUMENTS 11,099,275 B1 * 8/2021 Zhang ................. G06F 18/2193
11,486,548 B2 * 11/2022 Du .......................... G01M 3/38
(Continued)

FOREIGN PATENT DOCUMENTS

CN 101845788 A 9/2010
CN 108319920 A 7/2018
(Continued)

OTHER PUBLICATIONS

Y. Fei et al., "Pixel-Level Cracking Detection on 3D Asphalt Pavement Images Through Deep-Learning- Based CrackNet-V," in IEEE Transactions on Intelligent Transportation Systems, vol. 21, No. 1, pp. 273-284, Jan. 2020, doi: 10.1109/TITS.2019.2891167. (Year: 2020).*

(Continued)

*Primary Examiner* — Wesley J Tucker
(74) *Attorney, Agent, or Firm* — Lempia Summerfield Katz LLC

(57) ABSTRACT

A precision three-dimensional pavement faulting measurement method includes: acquiring three-dimensional pavement contour data; based on the three-dimensional pavement contour data, obtaining a contour reference surface and a contour deviation between measuring points in the three-dimensional pavement contour data and the contour reference surface; based on the contour deviation, obtaining a
(Continued)

suspected joint point; based on the suspected joint point, obtaining a suspected joint denoised binary image; based on a row direction projection feature of target measuring points in the suspected joint denoised binary image, obtaining an original joint target image and a joint representative position; based on the suspected joint denoised binary image, the original joint target image, and the joint representative position, obtaining a target joint binary image by means of a joint extension operation; and based on the target joint binary image and the three-dimensional pavement contour data, obtaining pavement faulting information.

9 Claims, 3 Drawing Sheets

(58) Field of Classification Search
CPC . G06T 2207/30184; G06T 2207/30256; G06T 7/13
See application file for complete search history.

(56) References Cited

U.S. PATENT DOCUMENTS

| | | | | |
|---|---|---|---|---|
| 12,067,737 | B2 * | 8/2024 | Shan | G06T 7/593 |
| 2013/0155061 | A1 | 6/2013 | Jahanshahi | |
| 2018/0137612 | A1 * | 5/2018 | Li | G06T 7/187 |
| 2018/0195973 | A1 * | 7/2018 | Yonekawa | G01B 11/30 |
| 2019/0197340 | A1 * | 6/2019 | Li | G06T 7/521 |
| 2024/0167962 | A1 * | 5/2024 | Ramos | G06T 7/0004 |
| 2024/0281773 | A1 * | 8/2024 | Toribio | G06F 18/2431 |
| 2024/0386539 | A1 * | 11/2024 | Cao | G06F 18/241 |
| 2025/0101693 | A1 * | 3/2025 | Li | E01C 23/01 |
| 2025/0191380 | A1 * | 6/2025 | Nepveaux | G06V 10/82 |

FOREIGN PATENT DOCUMENTS

| | | |
|---|---|---|
| CN | 111968079 A | 11/2020 |
| CN | 113701678 A | 11/2021 |

OTHER PUBLICATIONS

Safaei, N., Smadi, O., Masoud, A. et al. An Automatic Image Processing Algorithm Based on Crack Pixel Density for Pavement Crack Detection and Classification. Int. J. Pavement Res. Technol. 15, 159-172 (2022). https://doi.org/10.1007/s42947-021-00006-4 (Year: 2022).*

Zakeri, H., Nejad, F.M. & Fahimifar, A. Image Based Techniques for Crack Detection, Classification and Quantification in Asphalt Pavement: A Review. Arch Computat Methods Eng 24, 935-977 (2017). https://doi.org/10.1007/s11831-016-9194-z (Year: 2017).*

International Search Report for International App. PCT/CN2022/085609 mailed Sep. 7, 2022.

Journal of Tongju University: "Cement concrete pavement misalignment detection method based on binocular vision" vol. 39 No. 2. Feb. 2011. pp, 1-7, with English abstract.

* cited by examiner

PRECISION THREE-DIMENSIONAL PAVEMENT FAULTING MEASUREMENT METHOD AND APPARATUS

CROSS-REFERENCE TO RELATED APPLICATION

The present application is a § 371 nationalization of PCT Application Serial Number PCT/CN2022/085609, filed Apr. 7, 2022, designating the United States which is hereby incorporated in its entirety by reference. The present application also claims priority to Chinese patent application No. 202111572820.4, filed on Dec. 21, 2021, entitled "Precision Three-Dimensional Pavement Faulting Measurement Method and Apparatus", which is hereby incorporated by reference in its entirety.

TECHNICAL FIELD

The present disclosure relates to the field of pavement detection, and in particular to a method and a device for detecting pavement faulting based on precision three dimension.

BACKGROUND

Pavement faulting is a difference in elevation between two adjacent cement slabs at a transverse joint on cement concrete pavement. Faulting is an important factor affecting roughness and service life of the cement concrete pavement as well as reflection cracks after overlaying. It is also an important index that should be considered in evaluation of technical conditions, maintenance and overlay design of the cement concrete pavement. Therefore, how to accurately and efficiently detect and evaluate the faulting has become a great concern to highway management and maintenance department.

At present, commonly used modes for detecting a faulting value include a manual mode and an automatic detection mode. The manual mode uses a ruler, a vernier scale or a level and results in low speed, low precision and interference with traffic. The automatic detection mode uses a laser profiler, an ultrasonic profiler or the like due to the existence of the faulting will significantly affect features of the international roughness index (IRI). A profiler is expensive and cannot accurately measure the faulting (its measurement results are easily affected by cracks, peeling or other factors because of only having a small number of longitudinal profiles).

It can be seen that a traditional technology for detecting faulting has problems of large measurement errors, low detection efficiency, expensive equipment cost, etc.

SUMMARY

The present disclosure provides a method and a device for detecting pavement faulting based on precision three dimension (3D), which solves defects of large measurement errors, low detection efficiency, and expensive equipment cost in the related art, reduces measurement errors, and improves detection efficiency.

The present disclosure provides a method for detecting pavement faulting based on precision 3D. The method includes obtaining pavement 3D contour data and obtaining a contour reference surface and a contour deviation between a measurement point in the pavement 3D contour data and the contour reference surface based on the pavement 3D contour data. The method also includes obtaining a suspected joint point based on the contour deviation and obtaining a denoised binary image of a suspected joint based on the suspected joint point. The method also includes obtaining an original joint target image and a joint representative position based on a row direction projection feature of a target measurement point in the denoised binary image of the suspected joint. The method also includes obtaining a target joint binary image through a joint extension operation based on the denoised binary image of the suspected joint, the original joint target image, and the joint representative position. The method also includes obtaining pavement faulting information based on the target joint binary image and the pavement 3D contour data.

According to the method for detecting pavement faulting of the present disclosure, obtaining the denoised binary image of the suspected joint based on the suspected joint point includes: obtaining an original suspected joint point binary image based on the suspected joint point; taking a connected region in the original suspected joint point binary image as a unit; and denoising based on a length of the connected region, a magnitude of the contour deviation, and a direction feature of the connected region to obtain the denoised binary image of the suspected joint.

According to the method for detecting pavement faulting of the present disclosure, obtaining the original joint target image and the joint representative position based on the row direction projection feature of the target measurement point in the denoised binary image of the suspected joint includes: projecting a target point in the denoised binary image of the suspected joint along a row direction to obtain suspected joint points in each row; and obtaining the original joint target image and the joint representative position based on the statistical features of the suspected joint points in each row.

According to the method for detecting pavement faulting of the present disclosure, obtaining the original joint target image and the joint representative position based on the statistical features of the suspected joint points in each row includes: determining, in response to a determination that a number of suspected joint points in a current row is greater than a preset number, the suspected joint points in the current row as joint seed points; obtaining the original joint target image based on the joint seed points; determining joints having a row spacing smaller than a preset row spacing as target joint rows; merging the target joint rows into one joint; and determining a row average of the target joint row as the joint representative position. The target joint row is the row where the joint seed point locates.

According to the method for detecting pavement faulting of the present disclosure, obtaining the target joint binary image through the joint extension operation based on the denoised binary image of the suspected joint, the original joint target image and the joint representative position includes: determining, within a first target range corresponding to a joint seed point, measurement points in the denoised binary image of the suspected joint and belonging to a same connected region as the joint seed point, as supplementary joint points; obtaining a spread joint binary image based on the joint seed point and the supplementary joint points; searching joint points in the spread joint binary image within a second target range corresponding to the joint representative position; performing linear fitting on the searched joint points to obtain a fitted joint; determining, within a third target range corresponding to the joint representative position, a position of the fitted joint in a column having a missing joint in the spread joint binary image as an extended joint target point; and obtaining the target joint binary image based on the joint seed point, the supplementary joint point, and the extended joint target point.

According to the method for detecting pavement faulting of the present disclosure, obtaining the pavement 3D contour data and obtaining the contour reference surface and the contour deviation between the measurement point in the pavement 3D contour data and the contour reference surface based on the pavement 3D contour data includes: replacing, in response to a determination that the pavement 3D contour data has an invalid measurement point, the invalid measurement point with a valid measurement point near the invalid measurement points to obtain new pavement 3D contour data; processing the new pavement 3D contour data through filtering or frequency domain transformation to obtain the contour reference surface; and obtaining a difference between the new pavement 3D contour data and the contour reference surface to obtain the contour deviation. The suspected joint point is a measurement point corresponding to a contour deviation greater than a segmentation threshold.

According to the method for detecting a faulting on a pavement provided in the present disclosure, obtaining the pavement faulting information based on the target joint binary image and the pavement 3D contour data includes: obtaining representative elevations of pavements on front and back sides of the joint based on the target joint binary image; and obtaining the pavement faulting information based on the representative elevations of pavements on front and back sides of the joint.

According to the method for detecting pavement faulting of the present disclosure, obtaining the representative elevations of pavements on front and back sides of the joint based on the target joint binary image includes: searching a joint starting point and a joint ending point within a fourth target range by taking a fitted joint as a center based on the target joint binary image; determining, within a fifth target range corresponding to the joint starting point, an average elevation of the pavement adjacent to the fitted joint as a representative elevation of the pavement on the front side to obtain a set of the representative elevation of the pavement on the front side, wherein the pavement on the front side is the pavement in a forward direction of a vehicle; and determining, within a sixth target range corresponding to the joint ending point, an average elevation of the pavement adjacent to the fitted joint as a representative elevation of the pavement on the back side to obtain a set of the representative elevation of the pavement on the back side.

According to the method for detecting pavement faulting of the present disclosure, obtaining the pavement faulting information based on the representative elevations of pavements on front and back sides of the joint includes obtaining one or more of a full-width faulting value, left and right wheel track faulting values, a maximum faulting value, an average value of the full-width faulting, a median of the full-width faulting and/or a weighted full-width faulting value based on the representative elevations of pavements on front and back sides of the joint. The full-width faulting value is calculated by calculating absolute differences between the representative elevation of the pavement on the front side and the representative elevation of the pavement on the back side column by column to obtain full-width faulting values of multi columns. A column direction corresponds to a pavement width direction, and the row direction is perpendicular to the column direction. The left and right wheel track faulting values are calculated by selecting full-width faulting values of corresponding columns of the left wheel track and the right wheel track as the left and right wheel track faulting values respectively based on a corresponding relationship between positions of the pavement 3D contour data in a column direction and a pavement width direction. The weighted full-width faulting value is calculated by: calculating a minimum distance in the pavement width direction between the full-width faulting values of each column and corresponding columns of the left wheel track and the right wheel track based on the full-width faulting values of multi columns; calculating weights corresponding to the full-width faulting values of each column based on the minimum distance in the pavement width direction and a distance between the left wheel track and the right wheel track in the pavement width direction; and calculating the weighted full-width faulting value based on the full-width faulting values of multi columns and the weights corresponding to full-width faulting values of each column.

The present disclosure further provides a device for detecting pavement faulting based on precision 3D. The device includes a first calculating module, configured to obtain pavement 3D contour data and obtain a contour reference surface and a contour deviation between a measurement point in the pavement 3D contour data and the contour reference surface based on the pavement 3D contour data. The device also includes a second calculating module, configured for obtaining a suspected joint point based on the contour deviation, and obtaining a denoised binary image of a suspected joint based on the suspected joint point. The device also includes a third calculating module, configured to obtain an original joint target image and a joint representative position based on a row direction projection feature of a target measurement point in the denoised binary image of the suspected joint. The device also includes a fourth calculating module, configured to obtain a target joint binary image through a joint extension operation based on the denoised binary image of the suspected joint, the original joint target image and the joint representative position. The device also includes a fifth calculating module, configured for obtaining pavement faulting information based on the target joint binary image and the pavement 3D contour data.

The present disclosure further provides an electronic device, including a memory, a processor, and a computer program stored on the memory and executable on the processor. The computer program, when executed by the processor, causes the process to perform steps of any of the above-mentioned methods for detecting pavement faulting.

The present disclosure further provides a non-transitory computer-readable storage medium, having a computer program stored thereon. The computer program, when executed by a processor, causes the processor to perform steps of any of the above-mentioned methods for detecting pavement faulting.

The present disclosure further provides a computer program product, including a computer program. When executed by a processor, the computer program performs steps of any of the above-mentioned methods for detecting pavement faulting.

In the method and a device for detecting pavement faulting based on precision 3D provided by the present disclosure, a contour reference surface and a contour deviation are calculated by obtaining pavement 3D contour data, a suspected joint point is further determined, a target joint binary image is obtained, and pavement faulting information is finally obtained. The entire process of calculating the pavement faulting information is completed automatically without manual detection, and expensive equipment such as laser profilers and ultrasonic profilers are also not required for pavement faulting detection. Therefore, the method for detecting pavement faulting provided by the present disclosure can not only improve the detection efficiency of pavement faulting, reduce the detection error of pavement faulting, but also does not require usage of expensive profilers, thereby reducing the cost of pavement faulting detection.

BRIEF DESCRIPTION OF DRAWINGS

In order to illustrate solutions of embodiments according to the present disclosure or the related art more clearly, the accompanying drawings used in the description of the embodiments or the related art are briefly introduced below. It should be noted that the drawings in the following description are only some embodiments of the present disclosure. For those of ordinary skill in the art, other drawings can be obtained according to these drawings without creative effort.

DETAILED DESCRIPTION OF THE EMBODIMENTS

In order to illustrate purposes, solutions, and advantages of the present disclosure more clearly, solutions according to the present disclosure are clearly described below in combination with the accompanying drawings in the present disclosure. It should be noted that the described embodiments are some embodiments of the present disclosure, rather than all embodiments. Based on the embodiments of the present disclosure, all other embodiments obtained by those of ordinary skill in the art without creative effort are within the scope of protection of the present disclosure.

The method and a device for detecting pavement faulting based on precision three dimensional (3D) of the present disclosure are described below with reference to FIG. 1 to FIG. 7.

Figures 1, 2:
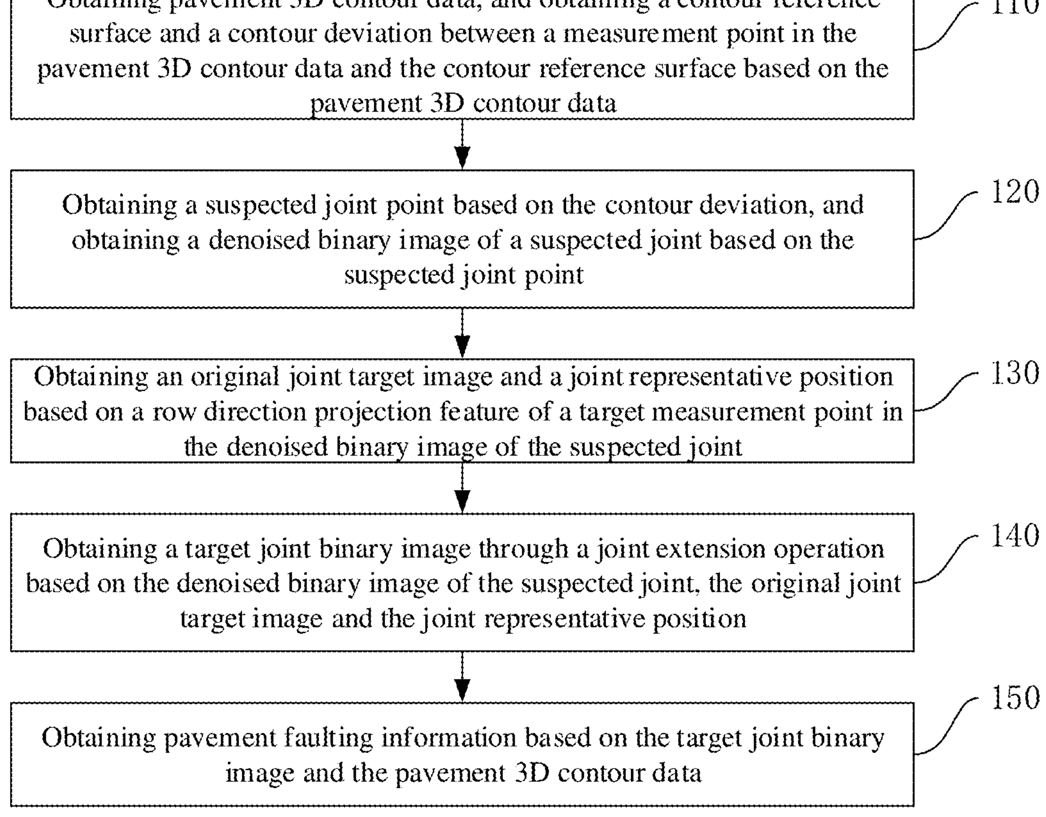
FIG. 1 is a first schematic flow chart of a method for detecting pavement faulting according to one embodiment of the present disclosure.
FIG. 2 is a first original suspected joint point binary image according to one embodiment of the present disclosure.

As shown in FIG. 1, a method for detecting pavement faulting according to the present disclosure includes the following steps.

Step 110 includes obtaining pavement 3D contour data and obtaining a contour reference surface and a contour deviation between a measurement point in the pavement 3D contour data and the contour reference surface based on the pavement 3D contour data.

It can be understood that the pavement 3D contour data may be 3D contour data obtained by performing row-scanning on the pavement.

In this embodiment, precise pavement 3D contour data may be used as input. The precise pavement 3D contour data are obtained based on a set of 3D pavement data collecting systems consisted of two row-scanning 3D measurement sensors.

3D modeling and processing are performed on the pavement 3D contour data. The row-scanning 3D measurement sensor consists of a 3D camera, a laser, a controller, and an a measurement sensor. In the row-scanning 3D measurement sensor, the laser projects a laser line along a pavement width direction, and the row-scanning 3D measurement sensor can obtain elevation data of a cross-section of the pavement in a single measurement. A sampling interval of the row-scanning 3D measurement sensor in a cross-sectional direction is 1-3 mm, such as 1 mm, and a sampling interval in a driving direction is 1-5 mm, such as 5 mm, with a measuring width of 2000-4000 mm, such as 3600 mm.

Further, after the pavement 3D contour data are obtained, the pavement 3D contour data can be preprocessed first, by processing abnormal measurement values, obtaining the contour reference surface, and obtaining the contour deviation.

Step 120 includes obtaining a suspected joint point based on the contour deviation and obtaining a denoised binary image of a suspected joint based on the suspected joint point.

Step 130 includes obtaining an original joint target image and a joint representative position based on a row direction projection feature of a target measurement point in the denoised binary image of the suspected joint.

It can be understood that the suspected joint point is a measurement point that may be a joint point after preliminary judgment. The joint representative position is a representative position corresponding to merging the joint rows whose row distance are smaller than a preset row spacing into one joint based on distribution information of the row where the joint is located.

Step 140 includes obtaining a target joint binary image through a joint extension operation based on the denoised binary image of the suspected joint, the original joint target image, and the joint representative position.

It can be understood that, after obtaining the original joint target image and the joint representative position, joint extension can also be performed based on the original joint target image and the joint representative position. The joint extension includes a connected region spread and a missing region extension, and the target joint binary image is finally obtained.

Step 150 includes obtaining pavement faulting information based on the target joint binary image and the pavement 3D contour data.

It can be understood that, obtaining the pavement faulting information based on the target joint binary image may include that first, representative elevations of pavements on front and back sides of the joint are obtained based on the joint binary image, and then a pavement faulting value is calculated.

In some embodiments, obtaining the denoised binary image of the suspected joint based on the suspected joint point includes: obtaining an original suspected joint point binary image based on the suspected joint point; and taking a connected region in the original suspected joint point binary image as a unit, and denoising based on a length of the connected region, a magnitude of the contour deviation, and a direction feature of the connected region to obtain the denoised binary image of the suspected joint.

It can be understood that, obtaining the suspected joint point binary image based on the suspected joint point may include that first, a connected region is marked on the original suspected joint point binary image, and then the connected region is taken as a unit, denoising is performed based on length of the connected region, magnitude of the contour deviation, and a direction feature of the connected region, and a denoised suspected joint binary image is obtained.

In some embodiments, obtaining the original joint target image and a joint representative position based on a row direction projection feature of a target measurement point in the denoised binary image of the suspected joint includes: projecting a target point in the denoised binary image of the suspected joint along a row direction to obtain suspected joint points in each row; and obtaining the original joint target image and the joint representative position based on the statistical features of the suspected joint points in each row.

The statistical features of the suspected joint points in each row may be the number of suspected joint points in each row, and a ratio of the number of suspected joint points in each row to the total number of suspected joint points.

In some embodiments, obtaining the original joint target image and the joint representative position based on the statistical features of the suspected joint points in each row includes: determining, in case that the number of suspected joint points in a current row is greater than a preset number, the suspected joint points in the current row as joint seed points; obtaining the original joint target image based on the joint seed points; and determining joints having a row spacing smaller than a preset row spacing as target joint rows, merging the target joint rows into one joint, and determining a row average of the target joint row as the joint representative position. The target joint row is the row where the joint seed point locates.

It can be understood that joint target positioning includes obtaining a joint seed point and obtaining a joint representative position.

Obtaining the joint seed point obtaining mode includes: projecting the denoised binary image of the suspected joint along a row direction (a road direction); calculating the number of suspected joint points in each row; labelling, in case that the number of suspected joint points of a current row is greater than a preset number, the suspected joint point of the current row as the joint seed point; recording the row where the current joint locates; and taking the binary image consisted of the joint seed point as the original joint target image.

Obtaining joint representative position includes merging the joint rows whose row distance are smaller than a preset row spacing into one joint based on distribution information of the row where the joint is located, and taking a row average value as a merged joint representative position.

In some embodiments, obtaining the target joint binary image through the joint extension operation based on the denoised binary image of the suspected joint, the original joint target image and the joint representative position includes: determining, within a first target range corresponding to the joint seed point, measurement points in the denoised binary image of the suspected joint and belonging to a same connected region as the joint seed point, as supplementary joint points; obtaining a spread joint binary image based on the joint seed point and the supplementary joint points; searching joint points in the spread joint binary image within a second target range corresponding to the joint representative position, and performing linear fitting on the searched joint points to obtain a fitted joint; determining, within a third target range corresponding to the joint representative position, a position of the fitted joint in a column having a missing joint in the spread joint binary image as an extended joint target point; and obtaining the target joint binary image based on the joint seed point, the supplementary joint point and the extended joint target point.

It can be understood that the joint extension includes a connected region spread and a missing region extension.

A specific mode of extending the connected region is as follows: first, based on the joint seed points in the original joint target image, for each joint seed point, within the first target range, points in the denoised suspected joint binary image that belong to the same connected region as a current joint seed point are supplemented as joint points, and the spread joint binary image is obtained.

A specific method of extending the missing area as follows: based on the joint representative position information, for each joint, the joint representative position is taken as a center, joint points in the spread joint binary image are searched within the second target range, and linear fitting is performed on them to obtain a fitted joint. If it is within the second target range and the spread joint binary image having a column of missing joints, the position of the fitted joint in the corresponding column is taken as the joint target point, and the target joint binary image is obtained.

In some embodiments, obtaining the pavement 3D contour data, and obtaining the contour reference surface and the contour deviation between the measurement point in the pavement 3D contour data and the contour reference surface based on the pavement 3D contour data includes: replacing, in case that the pavement 3D contour data has an invalid measurement point, the invalid measurement point with a valid measurement point near the invalid measurement points to obtain new pavement 3D contour data; processing the new pavement 3D contour data through filtering or frequency domain transformation to obtain the contour reference surface; and obtaining a difference between the new pavement 3D contour data and the contour reference surface to obtain the contour deviation. The suspected joint point is a measurement point corresponding to a contour deviation greater than a segmentation threshold.

It can be understood that after obtaining the contour reference surface, the abnormal measurement values of the contour reference surface can be processed, and the contour reference surface is obtained by performing filtering (such as median filtering, low-pass filtering, mean filtering, total variation filtering), frequency domain transformation (such as Fourier transformation, wavelet transformation) or other modes on the pavement 3D contour data after processing abnormal measurement values.

The contour deviation is the difference between the 3D contour data after processing abnormal measurement values and the contour reference surface.

For each measurement point, the segmentation threshold is adaptively calculated based on the contour deviation near the measurement point. In case that the contour deviation value of the measurement point is greater than or equal to the segmentation threshold, the current measurement point is taken as a suspected joint point, and the original suspected joint point binary image is obtained.

In some embodiments, obtaining the pavement faulting information based on the target joint binary image and the pavement 3D contour data includes: obtaining representative elevations of pavements on front and back sides of the joint based on the target joint binary image; and obtaining the pavement faulting information based on the representative elevations of pavements on front and back sides of the joint.

Further, obtaining the representative elevations of pavements on front and back sides of the joint based on the target joint binary image includes: searching a joint starting point and a joint ending point within a fourth target range by taking the fitted joint as a center based on the target joint binary image; determining, within a fifth target range corresponding to the joint starting point, an average elevation of the pavement adjacent to the fitted joint as a representative elevation of the pavement on the front side to obtain a set of the representative elevation of the pavement on the front side, wherein the pavement on the front side is the pavement in a forward direction of a vehicle; and determining, within a sixth target range corresponding to the joint ending point, an average elevation of the pavement adjacent to the fitted joint as a representative elevation of the pavement on the back side to obtain a set of the representative elevation of the pavement on the back side.

It can be understood that the representative elevations of pavements on front and back sides of the joint, that is, the representative elevations of pavements on front and back sides of the fitted joint. Specifically, the representative elevations of pavements on front and back sides of the joint include a representative elevation set of the pavement on the front side and a representative elevation set of the pavement on the back side.

In some embodiments, obtaining the pavement faulting information based on the representative elevations of pavements on front and back sides of the joint includes obtaining one or more of a full-width faulting value, left and right wheel track faulting values, a maximum faulting value, an average value of the full-width faulting, a median of the full-width faulting and/or a weighted full-width faulting value based on the representative elevations of pavements on front and back sides of the joint.

It can be understood that the pavement faulting information includes one or more of a full-width faulting value, left and right wheel track faulting values, a maximum faulting value, an average value of the full-width faulting, a median of the full-width faulting and/or a weighted full-width faulting value.

The full-width faulting value is calculated by calculating absolute differences between the representative elevation of the pavement on the front side and the representative elevation of the pavement on the back side column by column to obtain full-width faulting values of multi columns, where a column direction corresponds to a pavement width direction, and the row direction is perpendicular to the column direction. The left and right wheel track faulting values are calculated by selecting full-width faulting values of corresponding columns of the left wheel track and the right wheel track as the left and right wheel track faulting values respectively based on a corresponding relationship between positions of the pavement 3D contour data in a column direction and a pavement width direction. The weighted full-width faulting value is calculated by: calculating a minimum distance in the pavement width direction between the full-width faulting values of each column and corresponding columns of the left wheel track and the right wheel track based on the full-width faulting values of multi columns; calculating weights corresponding to the full-width faulting values of each column based on the minimum distance in the pavement width direction and a distance between the left wheel track and the right wheel track in the pavement width direction; and calculating the weighted full-width faulting value based on the full-width faulting values of multi columns and the weights corresponding to full-width faulting values of each column.

It can be understood that the representative elevations of pavements on front and back sides of the joint are obtained, i.e., for each joint, the representative elevations of the pavements on front and back sides of the joint are obtained column by column. Obtaining the representative elevations of the pavements on front and back sides of the joint column by column includes: for each column of the joint, taking the position of the fitted joint as a center, within the third target range, searching a joint starting point and a joint ending point along a driving direction; above the joint starting point, taking an average elevation of the pavement adjacent to the joint within the fourth target range as the representative elevation of the pavement on the front side to obtain a set of the representative elevation of the pavement on the front side $\{FZ_1, FZ_2, L, FZ_n\}$; and below the joint ending point, taking an average elevation of the pavement adjacent to the joint within the fifth target range as the representative elevation of the pavement on the back side to obtain a set of the representative elevation of the pavement on the back side $\{BZ_1, BZ_2, L, BZ_n\}$ where n is the number of columns of the target joint binary image.

Calculation of the faulting value includes that faulting values of each joint are calculated respectively by calculating the full-width faulting value, the left and right wheel track faulting values, the maximum faulting value, the average value of the full-width faulting, the median of the full-width faulting and/or the weighted full-width faulting value.

Calculating the full-width faulting value includes calculating absolute differences between the representative elevation of the pavement on the front side and the representative elevation of the pavement on the back side column by column, which is denoted as $SS_j$, $\{SS_j|SS_j=\text{abs}(FZ_j-BZ_j), j=1, 2, L, n\}$.

Calculating the left and right wheel track faulting values includes in combination with a corresponding relationship between positions of the 3D pavement data in a column direction and a pavement width direction, selecting full-width faulting values of corresponding columns of the left wheel track and the right wheel track as the left and right wheel track faulting values respectively, which are denoted as $S_{Left}$ ($S_{Left}=\{SS_j|j=L\}$), $S_{Right}$ ($S_{Right}=\{SS_j|j=R\}$) respectively, where L and R are column numbers corresponding to the positions of the left and right wheel tracks respectively.

The calculating the maximum faulting value includes denoting the maximum value of the full-width faulting value as $S_{Max}$, $S_{Max}=\max\{SS_1, SS_2, L, SS_n\}$.

The calculating the average value of the full-width faulting includes denoting the average value of the full-width faulting value as $S_{Avg}$, $$S_{Avg} = \sum_{j=1}^{n} SS_j/n.$$

The calculating the median of the full-width faulting includes denoting the median of the full-width faulting, as $S_{Mid}$.

The calculating the weighted full-width faulting value includes performing weighted average on all values in the full-width faulting value set. The specific calculation steps are as follows.

Calculation of the adaptive weight. Based on a minimum distance in the width direction between each column in the full-width faulting value and columns where the left and right wheel tracks are located, and a distance between the left and right wheel tracks in the width direction, its own weight $w_j$ is calculated. The calculation formula is as follows:

$$w_j = \frac{|x_L - x_R|}{|x_L - x_R| + DIS_j}, \; j = 1, 2, L, n,$$

where $DIS_j=\min(|x_j-x_L|, |x_j-x_R|)$, j=1, 2, L, n, $x_j$ is the position of the j-th column in the width direction, and $x_L$, $x_R$ are the positions of the left and right wheel tracks in the width direction respectively.

Calculation of the weighted full-width faulting value. The weighted full-width faulting value $S_{weight}$ is calculated based on all faulting values in a column faulting value set and corresponding weights, and the calculation formula is as follows:

$$S_{weight} = \sum_{i=1}^{n}(SS_j * w_j) / \sum_{i=1}^{n} w_j.$$

Obtaining of faulting attributes includes obtaining of faulting mileage position information and obtaining of faulting severity. Obtaining the faulting mileage position information uses measured mileage information of a calculating unit, combined with relative position information of the faulting inside the calculating unit, to calculate the faulting mileage information. Obtaining faulting severity divides the faulting into various levels combined with the value of the faulting and disclosure requirements of customers.

The pavement 3D contour data, in combination with specific data processing modes, can also be used to detect pavement cracks, pavement rutting and other indicators.

In some other embodiments, the method for detecting pavement faulting includes preprocessing data, positioning joint, and obtaining faulting information.

Preprocessing data includes processing abnormal measurement values, obtaining the contour reference surface and obtaining the contour deviation.

Positioning joint includes segmenting suspected joint points, coarsely denoising suspected joint points, positioning joint target, and joint extension.

Obtaining faulting information includes obtaining representative elevations of pavements on front and back sides of the joint, calculating faulting values, and obtaining faulting attributes.

Preprocessing data includes processing abnormal measurement values, obtaining the contour reference surface, and obtaining the contour deviation.

Processing abnormal measurement values includes replacing a zero value measurement point (i.e. invalid measurement point) with a valid measurement point near the zero value measurement point.

Obtaining the contour reference surface includes performing mean filtering on the 3D contour data in which abnormal measurement values have been processed.

Obtaining the contour deviation includes obtaining the difference between the 3D contour data in which abnormal measurement values have been processed and the contour reference surface.

Segmenting suspected joint points includes that: for each measurement point, the segmentation threshold T1 (T1=2*Tex1) is adaptively calculated based on the average value of the contour deviation near the measurement point Tex1; and in case that the contour deviation value of the measurement point is greater than or equal to the segmentation threshold T1, the current point is taken as a suspected joint point, and the original suspected joint point binary image is obtained.

The coarsely denoising suspected joint points includes first, marking a connected region on the original suspected joint point binary image, and then taking the connected region as a unit, and denoising the original suspected joint point binary image based on a connected region length threshold LenT1 (LenT1=40 mm) and LenT2 (LenT2=400 mm), a contour deviation threshold T2 (T2=1.3*Tex2), and a horizontal angle threshold AngleT (AngleT=30°) to obtain a denoised suspected joint binary image, where Tex2 is the average value of the contour deviation corresponding to all points in the current suspected joint point binary image.

Positioning joint target includes obtaining the joint seed point and obtaining the joint representative position.

Obtaining the joint seed point includes: projecting the denoised binary image of the suspected joint along a row direction (a pavement direction); calculating the number of suspected joint points in each row; labelling, in case that the number of suspected joint points of a current row is greater than T2 (T2=n*0.2), the suspected joint point of the current row as the joint seed point; recording the row where the current joint locates; and denoting the binary image consisted of the joint seed point as the original joint target image.

Obtaining the joint representative position g mode includes: merging the joint rows whose row distance are smaller than T3 (T3=500 mm) into one joint based on distribution information of the row where the joint is located; and recording a row average value as a merged joint representative position.

The joint extension includes a connected region spread and a missing region extension.

The connected region spread is as follows: first, based on the joint seed points in the original joint target image, for each joint seed point, within the first target range (50 mm), points in the denoised binary image of the suspected joint that belong to the same connected region as a current joint seed point are supplemented as joint points, and the spread joint binary image is obtained.

The missing area extension is as follows: based on the joint representative position information, for each joint, the joint representative position is taken as a center, joint points in the spread joint binary image are searched within the second target range (300 mm), and linear fitting is performed on them to obtain a fitted joint. If it is within a given range (having a row direction of 500 mm) and the spread joint binary image having a column of missing joints, the position of the fitted joint in the corresponding column is taken as the joint target point, and the target joint binary image is obtained.

Obtaining faulting information includes obtaining representative elevations of pavements on front and back sides of the joint, calculating faulting values, and obtaining faulting attributes.

The representative elevations of pavements on front and back sides of the joint are obtained, i.e., for each joint, the representative elevations of the pavements on front and back sides of the joint are obtained column by column. A specific mode is as follows: for each column of the joint, the position of the fitted joint is taken as a center, within the third target range (having a row direction of 500 mm), a joint starting point and a joint ending point is found along a driving direction. Above the joint starting point, an average elevation of the pavement adjacent to the joint within the fourth target range (having a row direction of 50 mm) is taken as the representative elevation of the pavement on the front side to obtain a set of the representative elevation of the pavement on the front side $\{FZ_1, FZ_2, L, FZ_n\}$. Below the joint ending point, an average elevation of the pavement adjacent to the joint within the fifth target range (having a row direction of 50 mm) is taken as the representative elevation of the pavement on the back side to obtain a set of the representative elevation of the pavement on the back side $\{BZ_1, BZ_2, L, BZ_n\}$, where n (n=3600) is a number of columns of the target joint binary image.

Calculation of the faulting value is performed for each joint respectively and includes calculating the full-width faulting value, the left and right wheel track faulting values, the maximum faulting value, the average value of the full-width faulting, the median of the full-width faulting, and/or the weighted full-width faulting value.

Calculating the full-width faulting value includes calculating absolute differences between the representative elevation of the pavement on the front side and the representative elevation of the pavement on the back side column by column and denoting as $SS_j$, $\{SS_j | SS_j=abs(FZ_j-BZ_j), j=1, 2, L, n\}$.

Calculating the left and right wheel track faulting values includes: in combination with a corresponding relationship between positions of the 3D pavement data in a column direction and a pavement width direction, selecting full-width faulting values of corresponding columns of the left wheel track and the right wheel track as the left and right wheel track faulting values respectively and denoting them as $S_{Left}$ ($S_{Left}=\{SS_j | j=L\}$), $S_{Right}$ ($S_{Right}=\{SS_j | j=R\}$) respectively, where L and R (L=1100, and R=2700) are column numbers corresponding to the positions of the left and right wheel tracks respectively.

Calculating the maximum faulting value includes denoting the maximum value of the full-width faulting value as $S_{Max}$, $S_{Max}=\max\{SS_1, SS_2, L, SS_n\}$.

Calculating the average value of the full-width faulting includes denoting the average value of the full-width faulting value as $$S_{Avg} = \sum_{j=1}^{n} SS_j / n.$$

Calculating the median of the full-width faulting includes denoting the median of the full-width faulting as $S_{Mid}$.

Calculating the weighted full-width faulting value includes performing weighted average on all values in the full-width faulting value set. The specific calculation steps are as follows.

Calculation of the adaptive weight. Based on a minimum distance in the width direction between each column in the full-width faulting value and columns where the left and right wheel tracks are located, and a distance between the left and right wheel tracks in the width direction, its own weight $w_j$ is calculated, and the calculation formula is as follows:

$$w_j = \frac{|x_L - x_R|}{|x_L - x_R| + DIS_j}, \; j = 1, 2, L, n,$$

where $DIS_j=\min(|x_j-x_L|, |x_j-x_R|)$, j=1, 2, L, n, $x_j$ is the position of the j-th column in the width direction, and $x_L$, $x_R$ are the positions of the left and right wheel tracks in the width direction respectively.

Calculation of the weighted full-width faulting value. The weighted full-width faulting value $S_{Weight}$ is calculated based on all faulting values in a column faulting value set and corresponding weights, and the calculation formula is as follows:

$$S_{weight} = \sum_{i=1}^{n} (SS_j * w_j) / \sum_{i=1}^{n} w_j.$$

Obtaining faulting attributes includes obtaining faulting mileage position information and obtaining faulting severity. Obtaining the faulting mileage position information uses measured mileage information of a calculating unit, in combination with relative position information of the faulting inside the calculating unit, to calculate the faulting mileage information. The faulting severity is obtained by dividing the faulting into various levels in combination with the value of the faulting and application requirements of customers. Specifically, the faulting value <2.54 mm is classified as mild faulting, the faulting value ≥2.54 mm and ≤5.08 mm is classified as moderate faulting, and the faulting value ≥5.08 mm is classified as severe faulting.

Figures 3, 4, 5:
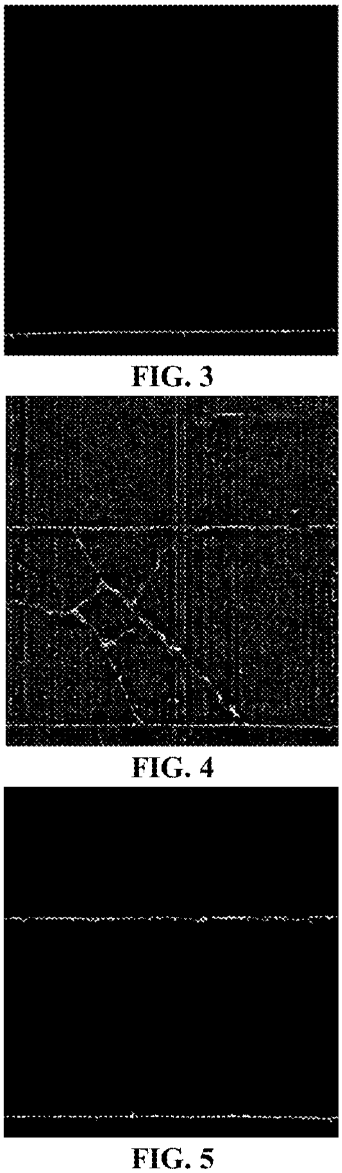
FIG. 3 is a diagram showing a joint positioning result corresponding to FIG. 2 according to one embodiment of the present disclosure.
FIG. 4 is a second original suspected joint point binary image according to one embodiment of the present disclosure.
FIG. 5 is a diagram showing a joint positioning result corresponding to FIG. 4 according to one embodiment of the present disclosure.

In the above embodiment, the first original suspected joint point binary image is shown in FIG. 2, and a diagram showing a joint positioning result corresponding to the first original suspected joint point binary image is shown in FIG. 3.

The second original suspected joint point binary image is shown in FIG. 4, and a diagram showing a joint positioning result corresponding to the second original suspected joint point binary image is shown in FIG. 5.

In FIG. 2 and FIG. 3, the average value of the full-width faulting of the joint is 2.07 mm, the median of the full-width faulting is 2.02 mm, the faulting value of the left wheel track is 1.84 mm, the faulting value of the right wheel track is 2.65 mm, and the maximum faulting value is 4.13 mm.

In FIG. 4 and FIG. 5, the average value of full-width faulting of the upper joint is 3.21 mm, the median of full-width faulting is 3.23 mm, the faulting value of the left wheel track is 3.65 mm, the faulting value of the right wheel track is 4.55 mm, and the maximum faulting value 7.27 mm.

In FIG. 4 and FIG. 5, the average value of the full-width faulting of the lower joint is 1.33 mm, the median of the full-width faulting is 0.77 mm, the faulting value of the left wheel track is 3.62 mm, the faulting value of the right wheel track is 0.87 mm, and the maximum faulting value 14.07 mm.

The precise pavement 3D contour data, combined with specific data processing modes, can also be used to detect pavement cracks, pavement rutting and other indicators.

The method for detecting pavement faulting provided by the present disclosure includes: obtaining pavement 3D contour data and obtaining a contour reference surface and a contour deviation between a measurement point in the pavement 3D contour data and the contour reference surface based on the pavement 3D contour data; obtaining the suspected joint point based on the contour deviation, and obtaining the denoised binary image of the suspected joint based on the suspected joint point; obtaining the original joint target image and the joint representative position based on the row direction projection feature of the target measurement point in the denoised binary image of the suspected joint; obtaining the target joint binary image through a joint extension operation based on the denoised binary image of the suspected joint, the original joint target image and the joint representative position; and obtaining pavement faulting information based on the target joint binary image and the pavement 3D contour data.

In the method for detecting pavement faulting of the present disclosure, a contour reference surface and a contour deviation are calculated after obtaining pavement 3D contour data, the suspected joint point is further determined, the target joint binary image is obtained, and pavement faulting information is finally obtained. The entire process of calculating the pavement faulting information is completed automatically without manual detection, and expensive equipment such as laser profilers and ultrasonic profilers are also not required for pavement faulting detection.

Therefore, the method for detecting pavement faulting provided by the present disclosure can not only improve the detection efficiency of pavement faulting and reduce the detection error of pavement faulting, but also not require usage of expensive profilers, thereby reducing the cost of pavement faulting detection.

The method for detecting faulting provided by the present disclosure has high measurement accuracy, which can effectively avoid the influence of pavement cracks and peeling on the detection results; the method for detecting faulting provided by the present disclosure is low in cost, and can share measurement equipment with pavement damage, road rutting, and other detection indicators.

The following is a description of the device for detecting pavement faulting provided by the present disclosure. The device for detecting pavement faulting described below and the method for detecting pavement faulting described above can be referred to in correspondence.

Figure 6:
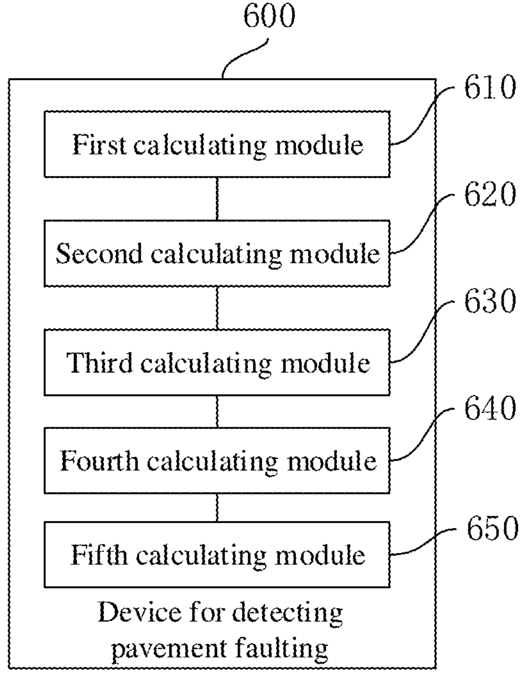
FIG. 6 is a schematic structural diagram of a device for detecting pavement faulting according to one embodiment of the present disclosure.

As shown in FIG. 6, the device for detecting pavement faulting 600 provided by the present disclosure includes: a first calculating module 610, a second calculating module 620, a third calculating module 630, a fourth calculating module 640, and a fifth calculating module 650.

The first calculating module 610 is configured to obtain pavement 3D contour data and obtain a contour reference surface and a contour deviation between a measurement point in the pavement 3D contour data and the contour reference surface based on the pavement 3D contour data.

The second calculating module 620 is configured to obtain a suspected joint point based on the contour deviation and obtain a denoised binary image of a suspected joint based on the suspected joint point.

The third calculating module 630 is configured to obtain an original joint target image and a joint representative position based on a row direction projection feature of a target measurement point in the denoised binary image of the suspected joint.

The fourth calculating module 640 is configured to obtain a target joint binary image through a joint extension operation based on the denoised binary image of the suspected joint, the original joint target image and the joint representative position.

The fifth calculating module 650 is configured to obtain pavement faulting information based on the target joint binary image and the pavement 3D contour data.

In some embodiments, the second calculating module 620 includes a first binary image generating unit and a binary image processing unit.

The first binary image generating unit is configured to obtain an original suspected joint point binary image based on the suspected joint point.

The binary image processing unit is configured to take a connected region in the original suspected joint point binary image as a unit. The binary image processing unit is configured to perform a denoising process based on a length of the connected region, a magnitude of the contour deviation, and a direction feature of the connected region to obtain the denoised binary image of the suspected joint.

In some embodiments, the third calculating module 630 includes a suspected point generating unit and a suspected point processing unit.

The suspected point generating unit is configured for projecting a target point in the denoised binary image of the suspected joint along a row direction to obtain suspected joint points in each row.

The suspected point processing unit is configured to obtain the original joint target image and the joint representative position based on the statistical features of the suspected joint points in each row.

In some embodiments, the suspected point processing unit includes a determining unit, a joint image generating unit, and a joint position calculating unit.

The determining unit is configured to determine, in case that the number of suspected joint points in a current row is greater than a preset number, the suspected joint points in the current row as joint seed points.

The joint image generating unit is configured to obtain the original joint target image based on the joint seed points.

The joint position calculating unit is configured to determine joints having a row spacing smaller than a preset row spacing as target joint rows, merge the target joint rows into one joint, and determine a row average of the target joint row as the joint representative position. The target joint row is the row where the joint seed point locates.

In some embodiments, the fourth calculating module 640 includes a supplementing unit, a spreading unit, a fitting unit, an extending unit, and a second binary image generating unit.

The supplementing unit is configured to, within a first target range corresponding to the joint seed point, determine measurement points in the denoised binary image of the suspected joint and belonging to a same connected region as the joint seed point, as supplementary joint points.

The spreading unit is configured to obtain a spread joint binary image based on the joint seed point and the supplementary joint points.

The fitting unit is configured to search joint points in the spread joint binary image within a second target range corresponding to the joint representative position and perform linear fitting on the searched joint points to obtain a fitted joint.

The extending unit is configured to determine, within a third target range corresponding to the joint representative position, a position of the fitted joint in a column having a missing joint in the spread joint binary image as an extended joint target point.

The second binary image generating unit is configured to obtain the target joint binary image based on the joint seed point, the supplementary joint point, and the extended joint target point.

In some embodiments, the first calculating module 610 includes a data obtaining unit, a data processing unit, and a deviation calculating unit.

The data obtaining unit is configured to replace, in case that the pavement 3D contour data has an invalid measurement point, the invalid measurement point with a valid measurement point near the invalid measurement points to obtain new pavement 3D contour data.

The data processing unit is configured to process the new pavement 3D contour data through filtering or frequency domain transformation to obtain the contour reference surface.

The deviation calculating unit is configured to obtain a difference between the new pavement 3D contour data and the contour reference surface to obtain the contour deviation, where the suspected joint point is a measurement point corresponding to a contour deviation greater than a segmentation threshold.

In some embodiments, the fifth calculating module 650 includes an elevation calculating unit and a faulting calculating unit.

The elevation calculating unit is configured to obtain representative elevations of pavements on front and back sides of the joint based on the target joint binary image.

The faulting calculating unit is configured to obtain the pavement faulting information based on the representative elevations of pavements on front and back sides of the joint.

In some embodiments, the elevation calculating unit includes: a searching unit, a first elevation determining unit, and a second elevation determining unit.

The searching unit is configured to search a joint starting point and a joint ending point within a fourth target range by taking the fitted joint as a center based on the target joint binary image.

The first elevation determining unit is configured to determine, within a fifth target range corresponding to the joint starting point, an average elevation of the pavement adjacent to the fitted joint as a representative elevation of the pavement on the front side to obtain a set of the representative elevation of the pavement on the front side. The pavement on the front side is the pavement in a forward direction of a vehicle.

The second elevation determining unit is configured to determine, within a sixth target range corresponding to the joint ending point, an average elevation of the pavement adjacent to the fitted joint as a representative elevation of the pavement on the back side to obtain a set of the representative elevation of the pavement on the back side.

In some embodiments, the faulting calculating unit is further configured to obtain one or more of a full-width faulting value, left and right wheel track faulting values, a maximum faulting value, an average value of the full-width faulting, a median of the full-width faulting, and/or a weighted full-width faulting value based on the representative elevations of pavements on front and back sides of the joint. The full-width faulting value is calculated by calculating absolute differences between the representative elevation of the pavement on the front side and the representative elevation of the pavement on the back side column by column to obtain full-width faulting values of multi columns, where a column direction corresponds to a pavement width direction, and the row direction is perpendicular to the column direction. The left and right wheel track faulting values are calculated by selecting full-width faulting values of corresponding columns of the left wheel track and the right wheel track as the left and right wheel track faulting values respectively based on a corresponding relationship between positions of the pavement 3D contour data in a column direction and a pavement width direction. The weighted full-width faulting value is calculated by: calculating a minimum distance in the pavement width direction between the full-width faulting values of each column and corresponding columns of the left wheel track and the right wheel track based on the full-width faulting values of multi columns; calculating weights corresponding to the full-width faulting values of each column based on the minimum distance in the pavement width direction and a distance between the left wheel track and the right wheel track in the pavement width direction; and calculating the weighted full-width faulting value based on the full-width faulting values of multi columns and the weights corresponding to full-width faulting values of each column.

The first calculating module 610 is configured to obtain pavement 3D contour data, and obtaining a contour reference surface and a contour deviation between a measurement point in the pavement 3D contour data and the contour reference surface based on the pavement 3D contour data.

The second calculating module 620 is configured to obtain an original joint target image and a joint representative position based on the contour deviation and obtain a denoised binary image of a suspected joint based on the suspected joint point.

The third calculating module 630 is configured to obtain a target joint binary image based on the original joint target image and the joint representative position.

The fourth calculating module 640 is configured to obtain pavement faulting information based on the target joint binary image.

In some embodiments, the second calculating module 620 includes a first binary image generating unit, and a joint calculating unit.

The first binary image generating unit is configured to obtain a suspected joint point binary image based on the suspected joint point.

The joint calculating unit is configured to project the suspected joint point binary image along a row direction to obtain suspected joint points in each row. The joint calculating unit is configured to obtain the original joint target image and the joint representative position based on the suspected joint points in each row.

In some embodiments, the joint calculating unit includes a seed point determining unit, a joint target image calculating unit, and a joint representative position calculating unit.

The seed point determining unit is configured to determine, in case that the number of suspected joint points in a current row is greater than a preset number, the suspected joint points in the current row as joint seed points.

The joint target image calculating unit is configured to obtain the original joint target image based on the joint seed points.

The joint representative position calculating unit is configured to determine joints having a row spacing smaller than a preset row spacing as target joint rows, merging the target joint rows into one joint, and determining a row average of the target joint row as the joint representative position. The joint row is the target row where the joint seed point locates.

In some embodiments, the third calculating module 630 includes a supplementary joint point calculating unit, a spreading unit, a fitting unit, a joint target calculating unit, and a second binary image generating unit.

The supplementary joint point calculating unit is configured to, within a first target range corresponding to the joint seed point, determine measurement points in the suspected joint point binary image and belonging to a same connected region as the joint seed point, as supplementary joint points.

The spreading unit is configured to obtain a spread joint binary image based on the supplementary joint points.

The fitting unit is configured to search joint points in the spread joint binary image within a second target range corresponding to the joint representative position and perform linear fitting on the searched joint points to obtain a fitted joint.

The joint target calculating unit is configured to determine, within a third target range corresponding to the joint representative position, a position of the fitted joint in a column having a missing joint in the spread joint binary image as a spread joint target point.

The second binary image generating unit is configured to obtain the target joint binary image based on the extended joint target point.

In some embodiments, the first calculating module 610 includes a denoising unit, a reference surface calculating unit, and a deviation calculating unit.

The denoising unit is configured to replace, in case that the pavement 3D contour data has an invalid measurement point, the invalid measurement point with a valid measurement point near the invalid measurement points to obtain new pavement 3D contour data.

The reference surface calculating unit is configured to process the new pavement 3D contour data through filtering or frequency domain transformation to obtain the contour reference surface.

The deviation calculating unit is configured to obtain a difference between the new pavement 3D contour data and the contour reference surface to obtain the contour deviation. The suspected joint point is a measurement point corresponding to a contour deviation greater than a segmentation threshold.

In some embodiments, the fourth calculating module 640 is further configured to obtain a full-width faulting value, left and right wheel track faulting values, a maximum faulting value, an average value of the full-width faulting, a median of the full-width faulting, and a weighted full-width faulting value based on the target joint binary image.

The electronic device, computer program product, and storage medium provided by the present disclosure are described below, and the electronic device, computer program product, and storage medium described below can be referred to in correspondence with the above-described method for detecting pavement faulting.

Figure 7:
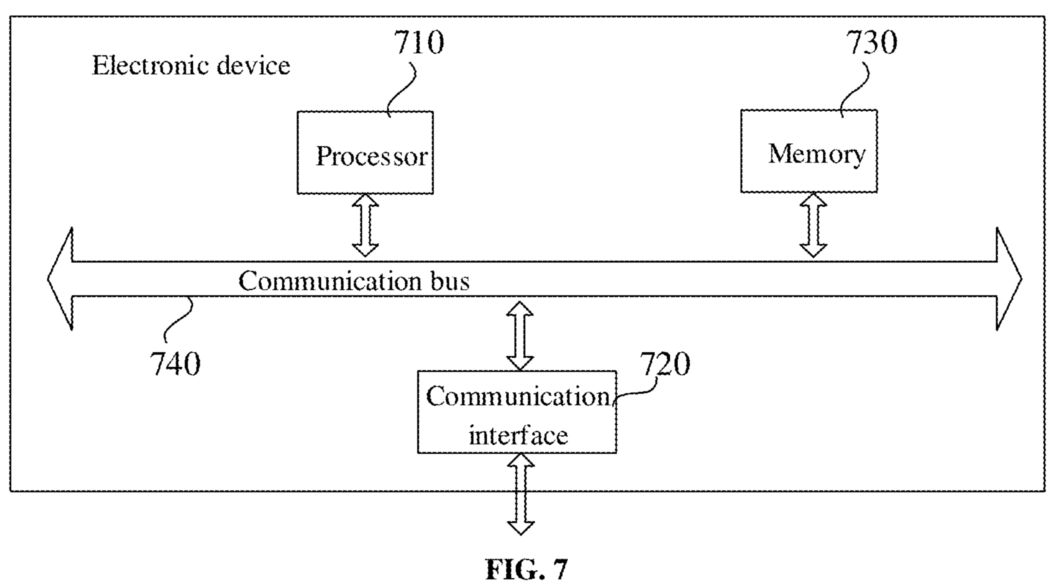
FIG. 7 is a schematic structural diagram of an electronic device according to one embodiment of the present disclosure.

FIG. 7 illustrates a schematic structural diagram of an electronic device according to the present disclosure. As shown in FIG. 7, the electronic device may include a processor 710, a communication interface 720, a memory 730, and a communication bus 740. The processor 710, the communication interface 720, and the memory 730 communicate with each other through the communication bus 740. The processor 710 can call logic instructions in the memory 730 to execute the method for detecting pavement faulting, and the method includes the following steps.

Step 110 includes obtaining pavement 3D contour data and obtaining a contour reference surface and a contour deviation between a measurement point in the pavement 3D contour data and the contour reference surface based on the pavement 3D contour data.

Step 120 includes obtaining a suspected joint point based on the contour deviation and obtaining a denoised binary image of a suspected joint based on the suspected joint point.

Step 130 includes obtaining an original joint target image and a joint representative position based on a row direction projection feature of a target measurement point in the denoised binary image of the suspected joint.

Step 140 includes obtaining a target joint binary image through a joint extension operation based on the denoised binary image of the suspected joint, the original joint target image, and the joint representative position.

Step 150 includes obtaining pavement faulting information based on the target joint binary image and the pavement 3D contour data.

In addition, the above-mentioned logic instructions in the memory 730 may be implemented in the form of a software functional unit and sold or used as an independent product. The above-mentioned logic instructions can be stored in a computer readable storage medium. Based on such understanding, some or all of solutions of the present disclosure can be embodied in the form of a software product, which is stored in a storage medium. The software product includes instructions to cause a computer device (which can be a personal computer, server, or network device, etc.) or a processor to perform all or part of the steps of the methods described in the respective embodiments of the present disclosure. The storage medium described above includes various media that can store program codes, such as USB flash disk, mobile hard disk, read-only memory (ROM), random access memory (RAM), magnetic disk, or optical disk.

On the other hand, the present disclosure further provides a computer program product, the computer program product includes a computer program, and the computer program can be stored on a non-transitory computer-readable storage medium. When the computer program is executed by a processor, the computer can perform steps of the method for detecting pavement faulting of each of the above methods. The method includes the following steps.

Step 110 includes obtaining pavement 3D contour data and obtaining a contour reference surface and a contour deviation between a measurement point in the pavement 3D contour data and the contour reference surface based on the pavement 3D contour data.

Step 120 includes obtaining a suspected joint point based on the contour deviation and obtaining a denoised binary image of a suspected joint based on the suspected joint point.

Step 130 includes obtaining an original joint target image and a joint representative position based on a row direction projection feature of a target measurement point in the denoised binary image of the suspected joint.

Step 140 includes obtaining a target joint binary image through a joint extension operation based on the denoised binary image of the suspected joint, the original joint target image, and the joint representative position.

Step 150 includes obtaining pavement faulting information based on the target joint binary image, and the pavement 3D contour data.

The present disclosure further provides a non-transitory computer-readable storage medium, having a computer program stored thereon, and when executed by a processor, the computer program performs steps of the method for detecting pavement faulting of each of the above methods. The method includes the following steps.

Step 110 includes obtaining pavement 3D contour data and obtaining a contour reference surface and a contour deviation between a measurement point in the pavement 3D contour data and the contour reference surface based on the pavement 3D contour data.

Step 120 includes obtaining a suspected joint point based on the contour deviation, and obtaining a denoised binary image of a suspected joint based on the suspected joint point.

Step 130 includes obtaining an original joint target image and a joint representative position based on a row direction projection feature of a target measurement point in the denoised binary image of the suspected joint.

Step 140 includes obtaining a target joint binary image through a joint extension operation based on the denoised binary image of the suspected joint, the original joint target image, and the joint representative position.

Step 150 includes obtaining pavement faulting information based on the target joint binary image and the pavement 3D contour data.

The device embodiments described above are merely illustrative, the units described as separate components may or may not be physically separate, and the components displayed as units may or may not be physical units, i.e., may be located at the same place or be distributed to multiple network units. Some or all of the modules may be selected based on actual needs to achieve the purpose of the solutions of the present embodiment. Those of ordinary skill in the art can understand and implement the solution described above without paying creative works.

Through the description of the embodiments above, those having ordinary skill in the art can understand that the various embodiments can be implemented by means of software and a necessary general hardware platform or by hardware. Based on such understanding, some or all of the above solutions of the present disclosure may be embodied in the form of a software product. The software product may be stored in a storage medium such as ROM/RAM, magnetic disk, compact disk, and the like and includes several instructions to cause a computer device (which may be a personal computer, server, network device and the like) to perform the methods described in various embodiments or a part thereof.

Finally, it should be noted that the above embodiments are only used to explain the solutions of the present disclosure and are not to limited them. Although the present disclosure has been described in detail with reference to the foregoing embodiments, it should be understood by those having ordinary skill in the art that they can still modify the solutions documented in the foregoing embodiments and make equivalent substitutions to a part of the features. These modifications and substitutions do not make the essence of the corresponding solutions depart from the protection scope of the present disclosure.

The invention claimed is:

1. A method for detecting pavement faulting based on precision three dimensional (3D), the method comprising:

obtaining pavement 3D contour data;

obtaining a contour reference surface and a contour deviation between a measurement point in the pavement 3D contour data and the contour reference surface based on the pavement 3D contour data;

obtaining a suspected joint point based on the contour deviation;

obtaining a denoised binary image of a suspected joint based on the suspected joint point;

obtaining an original joint target image and a joint representative position based on a row direction projection feature of a target measurement point in the denoised binary image of the suspected joint;

obtaining a target joint binary image through a joint extension operation based on the denoised binary image of the suspected joint, the original joint target image, and the joint representative position; and obtaining pavement faulting information based on the target joint binary image and the pavement 3D contour data.

2. The method of claim 1, wherein obtaining the denoised binary image of the suspected joint based on the suspected joint point comprises:

obtaining an original suspected joint point binary image based on the suspected joint point; and taking a connected region in the original suspected joint point binary image as a unit; and denoising based on a length of the connected region, a magnitude of the contour deviation, and a direction feature of the connected region to obtain the denoised binary image of the suspected joint.

3. The method of claim 2, wherein obtaining the original joint target image and the joint representative position based on the row direction projection feature of the target measurement point in the denoised binary image of the suspected joint comprises:

projecting a target point in the denoised binary image of the suspected joint along a row direction to obtain suspected joint points in each row; and obtaining the original joint target image and the joint representative position based on statistical features of the suspected joint points in each row.

4. The method of claim 3, wherein obtaining the original joint target image and the joint representative position based on the statistical features of the suspected joint points in each row comprises:

determining, in response to a determination that a number of suspected joint points in a current row is greater than a preset number, the suspected joint points in the current row as joint seed points;

obtaining the original joint target image based on the joint seed points;

determining joints having a row spacing smaller than a preset row spacing as target joint rows;

merging the target joint rows into one joint; and determining a row average of the target joint row as the joint representative position, wherein the target joint row is the row where the joint seed point locates.

5. The method of claim 1, wherein obtaining the target joint binary image through the joint extension operation based on the denoised binary image of the suspected joint, the original joint target image and the joint representative position comprises:

determining, within a first target range corresponding to a joint seed point, measurement points in the denoised binary image of the suspected joint and belonging to a same connected region as the joint seed point, as supplementary joint points;

obtaining a spread joint binary image based on the joint seed point and the supplementary joint points;

searching joint points in the spread joint binary image within a second target range corresponding to the joint representative position;

performing linear fitting on the searched joint points to obtain a fitted joint;

determining, within a third target range corresponding to the joint representative position, a position of the fitted joint in a column having a missing joint in the spread joint binary image as an extended joint target point; and obtaining the target joint binary image based on the joint seed point, the supplementary joint point, and the extended joint target point.

6. The method of claim 1, wherein obtaining the pavement 3D contour data and obtaining the contour reference surface and the contour deviation between the measurement point in the pavement 3D contour data and the contour reference surface based on the pavement 3D contour data comprises:

replacing, in response to a determination that the pavement 3D contour data has an invalid measurement point, the invalid measurement point with a valid measurement point near the invalid measurement points to obtain new pavement 3D contour data;

processing the new pavement 3D contour data through filtering or frequency domain transformation to obtain the contour reference surface; and obtaining a difference between the new pavement 3D contour data and the contour reference surface to obtain the contour deviation, wherein the suspected joint point is a measurement point corresponding to a contour deviation greater than a segmentation threshold.

7. The method of claim 1, wherein obtaining the pavement faulting information based on the target joint binary image and the pavement 3D contour data comprises:

obtaining representative elevations of pavements on front and back sides of the joint based on the target joint binary image; and obtaining the pavement faulting information based on the representative elevations of pavements on front and back sides of the joint.

8. The method of claim 7, wherein obtaining the representative elevations of pavements on front and back sides of the joint based on the target joint binary image comprises:

searching a joint starting point and a joint ending point within a fourth target range by taking a fitted joint as a center based on the target joint binary image;

determining, within a fifth target range corresponding to the joint starting point, an average elevation of the pavement adjacent to the fitted joint as a representative elevation of the pavement on the front side to obtain a set of the representative elevation of the pavement on the front side, wherein the pavement on the front side is the pavement in a forward direction of a vehicle; and determining, within a sixth target range corresponding to the joint ending point, an average elevation of the pavement adjacent to the fitted joint as a representative elevation of the pavement on the back side to obtain a set of the representative elevation of the pavement on the back side.

9. The method of claim 7, wherein obtaining the pavement faulting information based on the representative elevations of pavements on front and back sides of the joint comprises:

obtaining one or more of a full-width faulting value, left and right wheel track faulting values, a maximum faulting value, an average value of the full-width faulting, a median of the full-width faulting, or a weighted full-width faulting value based on the representative elevations of pavements on front and back sides of the joint, wherein the full-width faulting value is calculated by:

calculating absolute differences between the representative elevation of the pavement on the front side and the representative elevation of the pavement on the back side column by column to obtain full-width faulting values of multi columns, wherein a column direction corresponds to a pavement width direction, and a row direction is perpendicular to the column direction;

wherein the left and right wheel track faulting values are calculated by:

selecting full-width faulting values of corresponding columns of the left wheel track and the right wheel track as the left and right wheel track faulting values respectively based on a corresponding relationship between positions of the pavement 3D contour data in a column direction and a pavement width direction, and wherein the weighted full-width faulting value is calculated by:

calculating a minimum distance in the pavement width direction between the full-width faulting values of each column and corresponding columns of the left wheel track and the right wheel track based on the full-width faulting values of multi columns;

calculating weights corresponding to the full-width faulting values of each column based on the minimum distance in the pavement width direction and a distance between the left wheel track and the right wheel track in the pavement width direction; and calculating the weighted full-width faulting value based on the full-width faulting values of multi columns and the weights corresponding to full-width faulting values of each column.

* * * * *